(12) United States Patent
Petersen

(10) Patent No.: US 7,553,063 B2
(45) Date of Patent: *Jun. 30, 2009

(54) PRESS-IN PLACE LED FOR A DIGITAL SWITCHING CROSS-CONNECT MODULE

(75) Inventor: Cyle D. Petersen, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/703,051

(22) Filed: Feb. 5, 2007

(65) Prior Publication Data

US 2007/0223254 A1 Sep. 27, 2007

Related U.S. Application Data

(63) Continuation of application No. 10/879,893, filed on Jun. 21, 2004, now Pat. No. 7,182,502.

(51) Int. Cl.
*H01R 33/00* (2006.01)
(52) U.S. Cl. .................................... 362/652; 362/659
(58) Field of Classification Search ................. 362/652, 362/23, 659
See application file for complete search history.

(56) References Cited

U.S. PATENT DOCUMENTS

| 1,977,105 | A | * | 10/1934 | Wood ........................ 362/650 |
| 3,745,510 | A | * | 7/1973 | Mallon ........................ 439/78 |
| 3,794,278 | A | * | 2/1974 | Frey et al. .................. 248/27.3 |
| 3,989,343 | A |   | 11/1976 | Lucius et al. |
| 4,073,563 | A |   | 2/1978 | Bailey et al. |
| 4,618,194 | A |   | 10/1986 | Kwilos |
| 4,687,291 | A |   | 8/1987 | Stape et al. |
| 4,720,272 | A | * | 1/1988 | Durand ....................... 439/375 |
| 4,749,968 | A |   | 6/1988 | Burroughs |

(Continued)

FOREIGN PATENT DOCUMENTS

WO WO 93/20600 10/1993

(Continued)

OTHER PUBLICATIONS

Brochure, "Video Signal Distribution Products," ADC Telecommunications, 47 pages (Oct. 1996).

*Primary Examiner*—Anabel M Ton
(74) *Attorney, Agent, or Firm*—Merchant & Gould P.C.

(57) ABSTRACT

A tracer lamp unit for use with a DSX system is disclosed herein. The tracer lamp unit includes an elongate housing with a generally rounded cross section wherein the housing is configured to be secured within an opening defined by a piece of telecommunications equipment and held within with a press-fit, wherein the housing provides structural support for a lighting arrangement including a lens, a capacitor, a resistor, leads, and a flashing control circuitry, the housing further providing structural support for spring members including tail portions and electrical contact portions, wherein the electrical contact portions engage the leads to provide an electrical connection therebetween. In another embodiment, the tracer lamp unit comprises an LED flashing module that houses a lens, a capacitor, a resistor, leads, and a flashing control circuitry, wherein the tracer lamp unit housing is adapted to slidably receive, provide structural support for, and be separable from the LED flashing module.

21 Claims, 9 Drawing Sheets

U.S. PATENT DOCUMENTS

| | | |
|---|---|---|
| 4,768,961 A | 9/1988 | Lau |
| 4,815,104 A | 3/1989 | Williams et al. |
| 4,840,568 A | 6/1989 | Burroughs et al. |
| 5,145,416 A | 9/1992 | Cruise et al. |
| 5,147,992 A | 9/1992 | Eriksen et al. |
| 5,214,673 A | 5/1993 | Morgenstern et al. |
| 5,233,501 A | 8/1993 | Allen et al. |
| 5,246,378 A | 9/1993 | Seiceanu |
| 5,348,491 A | 9/1994 | Louwagie et al. |
| 5,366,388 A | 11/1994 | Freeman et al. |
| 5,393,249 A | 2/1995 | Morgenstern et al. |
| 5,413,494 A | 5/1995 | Dewey et al. |
| 5,467,062 A | 11/1995 | Burroughs |
| 5,513,082 A | 4/1996 | Asano |
| 5,538,438 A | 7/1996 | Orlando |
| 5,577,924 A | 11/1996 | Louwagie |
| 5,913,701 A | 6/1999 | Olson et al. |
| 5,947,771 A | 9/1999 | Bethurum |
| 6,019,521 A | 2/2000 | Manning et al. |
| 6,045,378 A | 4/2000 | Follingstad |
| 6,116,961 A | 9/2000 | Henneberger et al. |
| 6,132,259 A | 10/2000 | Chapman et al. |
| 6,241,562 B1 | 6/2001 | Benda et al. |
| 6,287,149 B1 | 9/2001 | Elkhatib et al. |
| 6,328,608 B1 | 12/2001 | Olson et al. |
| 6,352,444 B1 | 3/2002 | Yuzawa |
| 6,422,902 B1 | 7/2002 | Ogren et al. |
| 6,450,829 B1 | 9/2002 | Weisz-Margulescu |
| 6,503,105 B1 | 1/2003 | Johnsen |
| 6,543,626 B1 | 4/2003 | Mendoza |
| 6,589,062 B1 | 7/2003 | Ogren et al. |
| 6,619,993 B2 | 9/2003 | Jayne et al. |
| 6,626,705 B2 | 9/2003 | Perrone et al. |
| 6,743,044 B2 | 6/2004 | Musolf et al. |
| 6,830,486 B2 | 12/2004 | Norris et al. |
| 7,182,502 B2 * | 2/2007 | Petersen ................ 362/652 |
| 2004/0014365 A1 | 1/2004 | Norris et al. |

FOREIGN PATENT DOCUMENTS

| | | |
|---|---|---|
| WO | WO 94/08429 | 4/1994 |
| WO | WO 98/38703 | 9/1998 |
| WO | WO 00/30219 | 5/2000 |

* cited by examiner

PRESS-IN PLACE LED FOR A DIGITAL SWITCHING CROSS-CONNECT MODULE

This application is a continuation of application Ser. No. 10/879,893, filed Jun. 21, 2004, now U.S. Pat. No. 7,182,502 which application is incorporated herein by reference.

TECHNICAL FIELD

The present invention relates generally to digital cross-connect equipment. More particularly, the present invention relates to LED arrangements used in tracer lamp circuits of cross-connected switching modules.

BACKGROUND

In the telecommunications industry, the use of switching jacks to perform cross-connect and monitoring functions is well known. The jacks may be mounted to replaceable cards or modules, which in turn may be mounted in a chassis, and multiple chassis may be mounted together in an equipment rack. Modules for use in co-axial environments are described in U.S. Pat. No. 5,913,701, which is incorporated herein by reference. Modules for use in twisted pair applications are described in U.S. Pat. No. 6,116,961, which is also incorporated herein by reference. Cross-connect modules are also used with fiber optic communications systems.

FIG. 1 shows a prior art cross-connect arrangement of the type used for co-axial applications. The depicted arrangement includes two jack modules 20, 22. The jack modules 20, 22 may be mounted in separate chassis that are in turn mounted on separate racks. Each jack module 20, 22 is cabled to a separate network element (i.e., piece of telecommunications equipment). For example, jack module 20 is connected to equipment 24 by cables 26, and jack module 22 is connected to equipment 28 by cables 30. The pieces of equipment 24 and 28 are interconnected by cross-connect jumpers 32 placed between the two jack modules 20 and 22. Each jack module 20, 22 includes IN and OUT ports 34 and 36 for direct access to the equipment's input and output signals. Each module 20, 22 also includes X-IN and X-OUT ports 35, 37 for providing direct access to the cross-connect input and cross-connect output signals. Ports 34-37 provide a means to temporarily break the connection between the pieces of equipment 24 and 28 that are cross-connected together, and to allow access to the signals for test and patching operations. The jack modules 20, 22 also include monitor ports 38 for non-intrusive access to the input and output signals of each piece of telecommunications equipment 24, 28.

A typical telecommunications central office includes many jack modules and a large number of bundled cables interconnecting the modules. Consequently, absent indicators, it is difficult to quickly determine which two jack modules are cross-connected together. To assist in this function, the jack modules 20, 22 include indicator lights 40 wired to power 42 and ground 44. Switches 46 are positioned between the indicator lights 40 and ground 44. The indicator lights 40 are also electrically connected to pin jacks 48 located at the rear of the jack modules 20, 22. The pin jacks 48 provide connection locations for allowing the tracer lamp circuits corresponding to each of the modules 20, 22 to be interconnected by a cable 50 (i.e., a wire). The cable 50 is typically bundled with the cross-connect cables 32. When either switch 46 is closed, the indicator lamps 40 corresponding to both of the jack modules 20, 22 are connected to ground and thereby illuminated. Thus, by closing one of the switches 46, the two jack modules 20, 22 that are cross-connected can be easily identified by merely locating the illuminated tracer lamps. Examples of tracer lamp units are described in U.S. Pat. Nos. 4,840,568, 5,145,416, and 5,393,249, the entire disclosures of which are incorporated herein by reference.

SUMMARY

The present disclosure describes embodiments relating to LED arrangements used in tracer lamp circuits of cross-connected DSX jacks.

BRIEF DESCRIPTION OF THE DRAWINGS

The accompanying drawings, which are incorporated in and constitute a part of the specification, illustrate various embodiments that are examples of how certain inventions can be put into practice. A brief description of the drawings is as follows.

DETAILED DESCRIPTION

Figure 1:
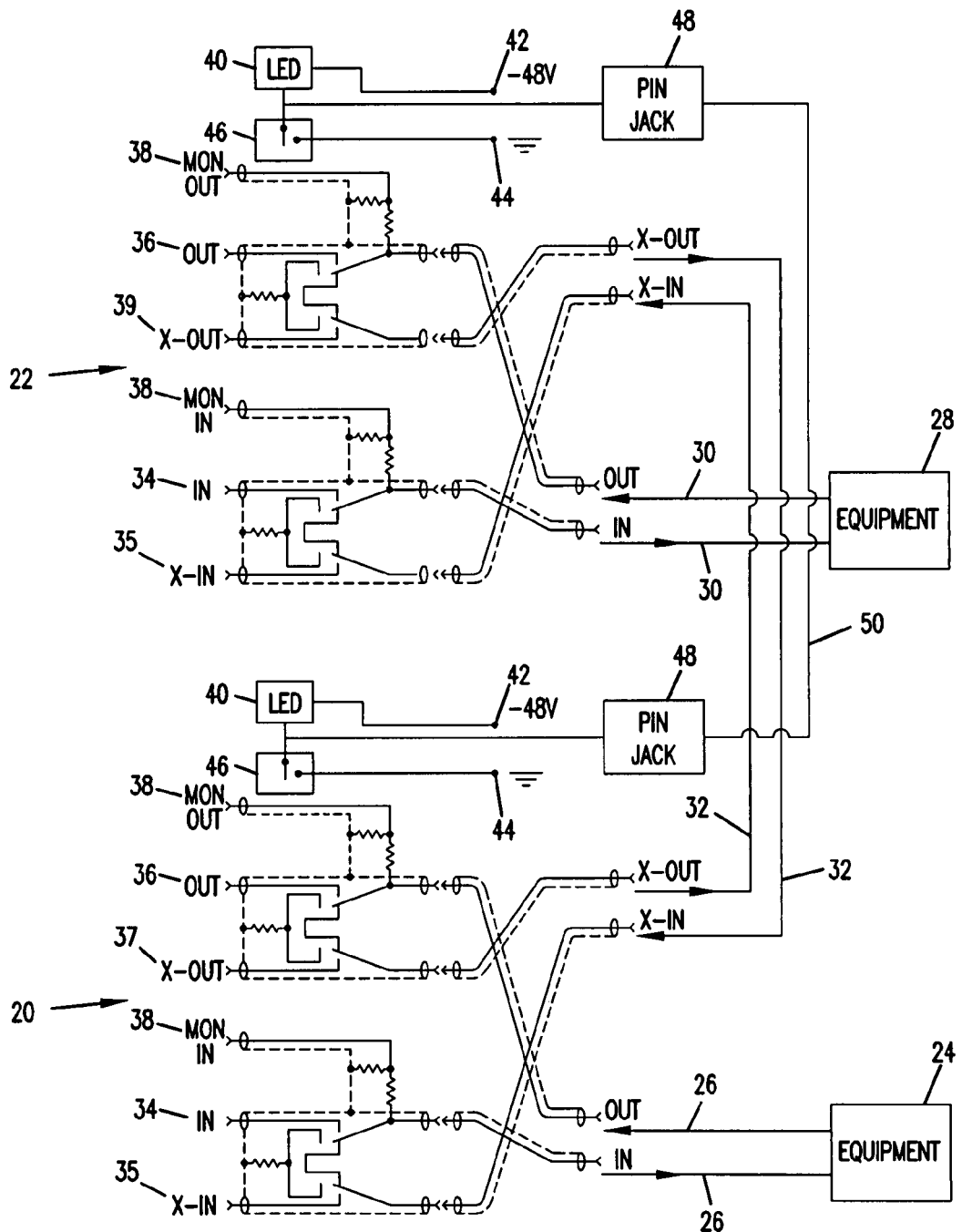
FIG. 1 shows a schematic view of a prior art cross-connect arrangement of the type used for co-axial applications.
Figure 2:
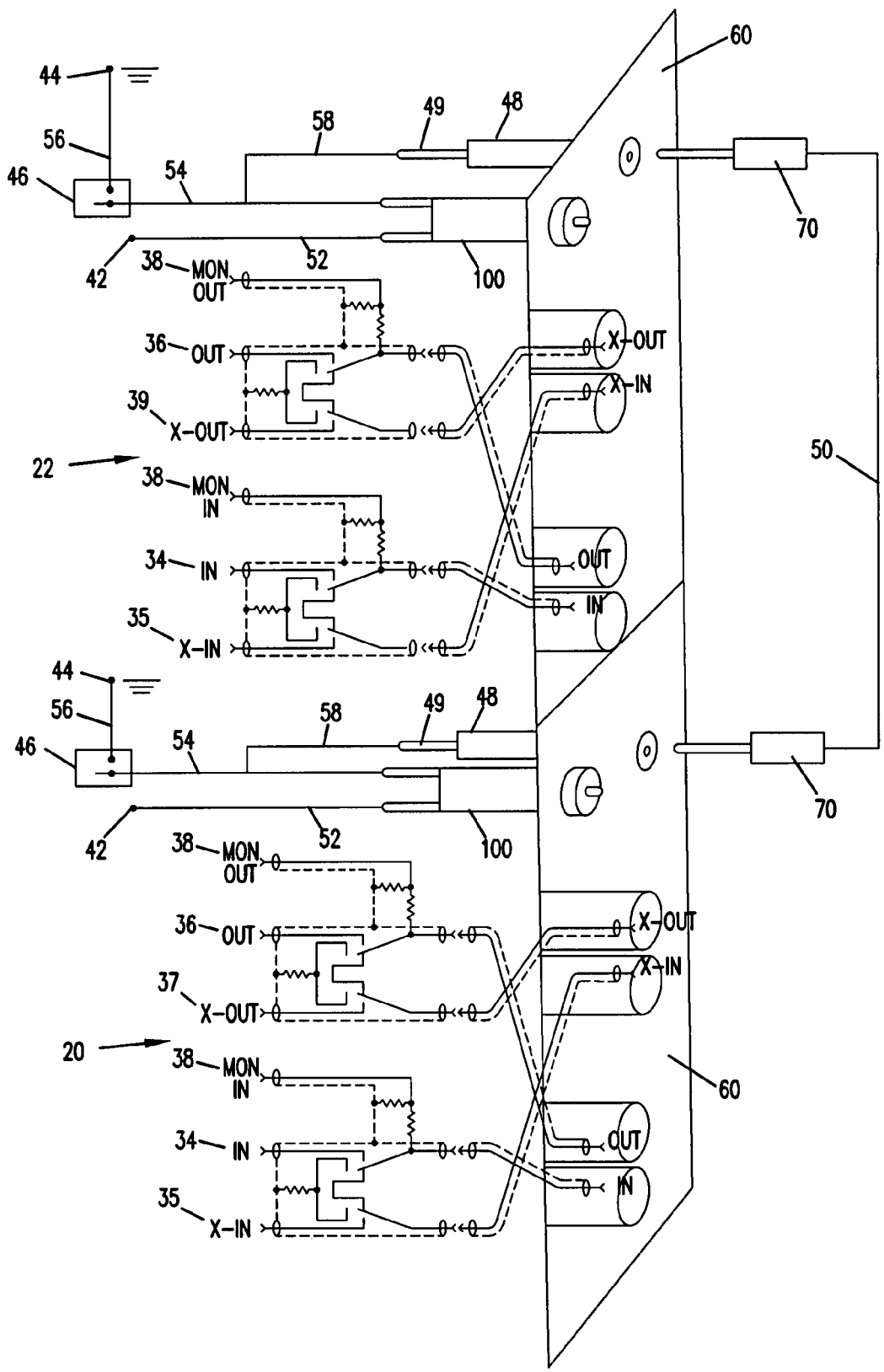
FIG. 2 shows a schematic view of a cross-connect arrangement of the type used for co-axial applications in combination with a diagrammatic view showing the face of a panel including connectors, pin jacks used to interconnect tracer lamp circuits of the cross-connect arrangement, and press-in place tracer lamp housings having features that are examples of inventive aspects in accordance with the present disclosure.

FIG. 2 schematically illustrates an example of a cross-connect system of the type in which tracer lamp units 100 may be used. The tracer lamp units 100 have features that are examples of inventive aspects in accordance with the principles of the present disclosure. In FIG. 2, the circuitry for linking the tracer lamp units 100 to the cross-connect system is also shown diagrammatically. Diagrammatically, the tracer lamp units 100 are illustrated in FIG. 2 as having been secured into openings defined by panels 60 that are part of the cross-connect system.

FIG. 2 schematically shows two DSX jack modules 20 and 22 wherein each of the jack modules 20 and 22 includes a tracer lamp circuit including switch 46, LED tracer lamp unit 100, pin jack unit 48 including conductors 49, and wires electrically interconnecting the components. The wires electrically interconnecting the components include wires 58 connecting pin jack units 48 to the switches 46, wires 52 connecting LED tracer lamp units 100 to power sources 42, wires 54 connecting the switches 46 to the LED tracer lamp units 100, and wires 56 connecting the switches 46 to the grounds 44.

It will be appreciated that wires 52, 54, 56 and 58 can be terminated to their respective components by conventional techniques such as wire wrap connections, soldering, crimping or via terminals. The switches 46, which have been illustrated schematically in FIG. 2, can be configured to be closed manually after pin jacks of two jack modules have been connected to determine the cross-connectivity of the jack modules or can be incorporated into the cross connect system in such a way that they are automatically closed when plugs are inserted into selected ones of the ports (e.g., monitor-ports 38), thereby illuminating the tracer lamp units 100.

Figure 3:
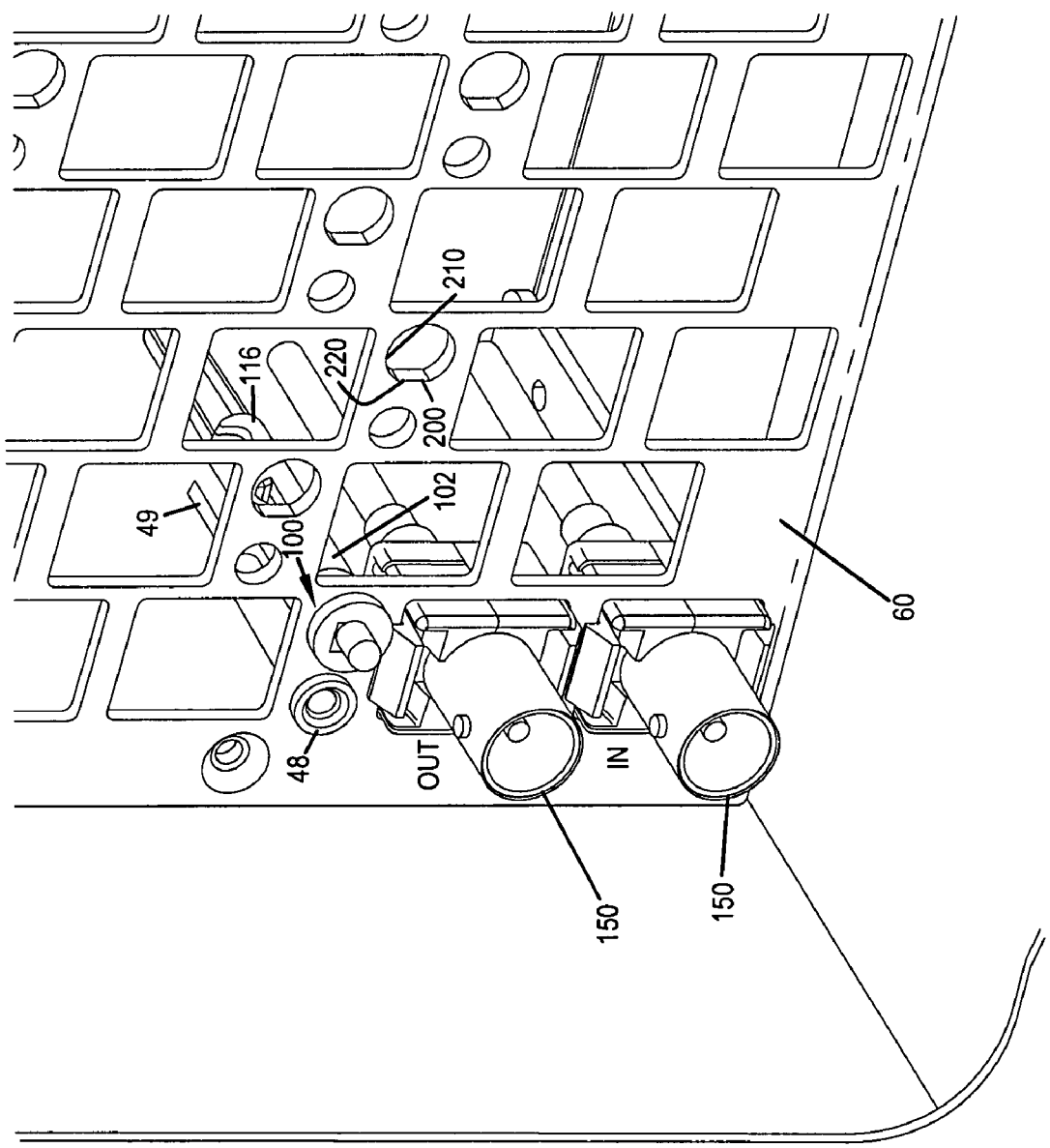
FIG. 3 shows a more detailed view of the face of one of the cross-connect panels including the connectors, the pin jack used to interconnect the tracer lamp circuit, and the press-in place tracer lamp housing.

FIG. 3 is a perspective view of a portion of one of the panels 60 schematically depicted in FIG. 2. As shown in FIG. 3, connectors (collectively referred to with reference number 150), the pin jack unit 48 including conductor 49, and the tracer lamp unit 100 are shown mounted in the panel 60.

A. Tracer Lamp Unit

FIGS. 4-11 illustrate a tracer lamp unit 100 in isolation from the remainder of the cross-connect system of FIG. 2. Generally, the tracer lamp unit 100 includes a housing 102 having a securement structure (e.g., shear ribs 128) for coupling the tracer lamp unit to a piece of telecommunications equipment such as a panel or a jack module. The tracer lamp unit 100 also includes a lighting arrangement 104 that mounts and is supported within the housing 102. The lighting arrangement may include arrangements such as an LED flashing arrangement or other arrangements. In one embodiment, the lighting arrangement 104 includes a lens 106 (e.g., any form of a lighting element that illuminates such as an LED, a bulb, etc.), a capacitor 107, a resistor 108, top and bottom leads 110, and flashing control circuitry including integrated circuit (IC) 109 or other means for controlling flashing of lens 106. The lighting arrangement 104 is shown schematically in FIG. 4A.

Flashing circuitry is optional and can have a variety of configurations. In one embodiment, an integrated circuit may include two timers on a monolithic chip. Alternatively, two separate timers could be used. One of the timers could operate in the a stable mode causing the LED to flash and the other timer could operate in a monostable mode causing the flashing to cease after a predetermined interval, with the LED remaining on. The capacitor 107 and the resistor 108 may together determine the flashing rate of the LED. The resistor 108 may determine the off-to-on ratio of the flashing cycle. The resistor 108 and the capacitor 107 may together determine the interval after which flashing ceases. By these two separate means, the flashing interval and the rate of flashing of the LED may be independently set. Examples of LED flashing control circuitry may be found in U.S. Pat. Nos. 4,840,568 and 4,618,194, the entire disclosures of which are incorporated herein by reference.

The tracer lamp unit housing 102 includes a first end 118 (e.g., a front end), a second end 116 (e.g., a back end), a longitudinal axis passing therethrough represented by the dashed line 120, a first side 117 (e.g., a right side), and a second side 119 (e.g., a left side). The housing 102 also includes an outer surface 122 adapted to contact the piece of telecommunications equipment when inserted within the opening defined by the telecommunications equipment.

Figure 10:
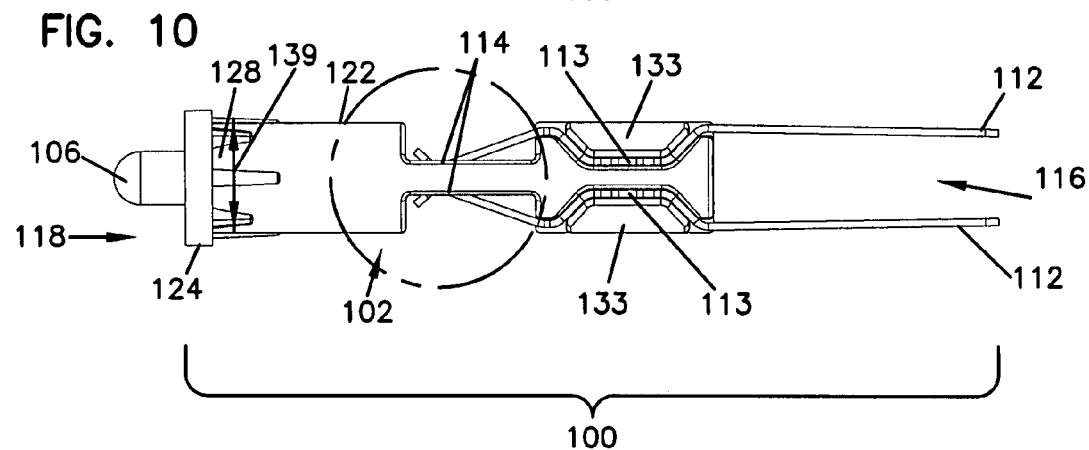
FIG. 10 shows a right side view of the embodiment of the tracer lamp unit of FIGS. 4-9 in an assembled configuration.
Figure 10A:
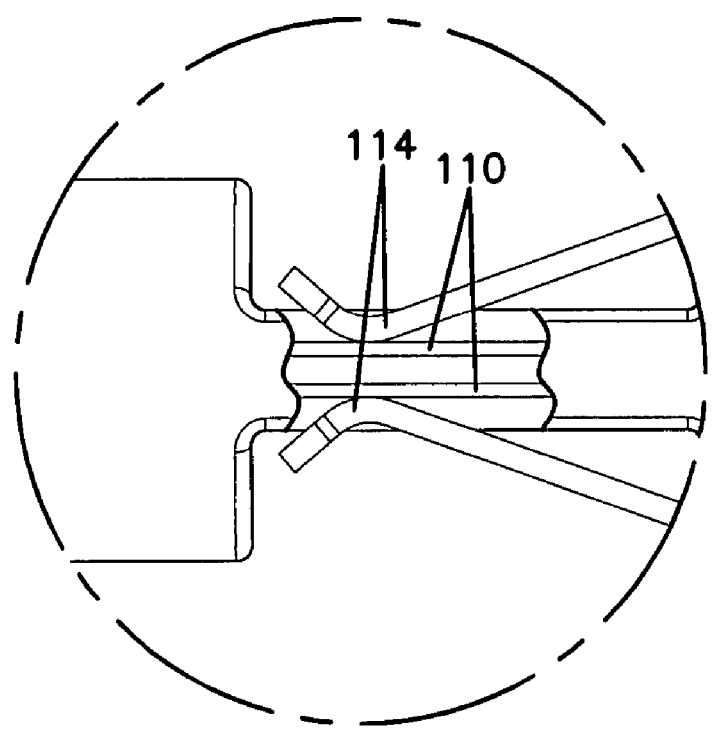
FIG. 10A shows an enlarged fragmentary view of the embodiment of the tracer lamp unit of FIGS. 4-10, with portions removed to show the contact between the leads of the lighting arrangement and the contact portions of the springs.

The tracer lamp unit housing 102 is configured to provide support for spring members 111 (e.g., FLED contact springs). The springs 111 include electrical contact portions 114 and tail portions 112 (e.g., wire-wrap tails) and stabilization/mounting portions 113 positioned between the contact portions 114 to the tail portions 112. The mounting portions 113 are adapted to be press-fit into notches 129 of the housing 102, the mounting portions 113 providing stability for the springs 111 when coupled to the housing 102. In other embodiments, the mounting portions 113 and the notches 129 may include intermating structure such as snap-fit components (e.g., ramps, teeth, and etc.) for securing the springs within the housing 102. The contact portions 114 are configured to fit within contact openings 127 of the housing 102. The contact portions 114 include tabs 149 projecting sideways from the contact portions. The tabs 149 rest on flat shoulders 148 of the housing 102 defined on the sides of the contact openings 127 of the housing. The tail portions 112 project rearwardly from the second end 116 of the housing 102 in a longitudinal direction. The contact portions 114 are adapted to contact the leads 110 of the lighting arrangement 104, as shown in FIG. 10A, and establish a connection between the leads 110 of the lighting arrangement 104 and the tail portions 112 of the springs 111. The tabs 149 of the springs 111 prevent the contact portions 114 from touching each other when the lighting arrangement is not inserted into the housing 102. Tail portions 112 can be connected to the cross-connect system by conventional techniques such as wire-wrap, solder, connectors or other techniques.

In a non-limiting embodiment, the tracer lamp unit housing 102 is made of a dielectric material such as molded plastic (e.g., polycarbonate), and is molded as a single, unitary piece. The housing 102 is shown in FIGS. 4-11 as having an elongate configuration including a generally rounded cross section. As used herein, "rounded" refers to any shape that is generally curvate including cylindrical, elliptical, oval, and etc.

The housing 102 includes a flange 124 that projects radially outwardly from the outer surface 122 at the first end 118 to ensure proper depth of insertion for the housing 102. In the embodiment of FIGS. 4-11, the flange 124 has a rounded cross section, but may have a cross-section of any shape (e.g., rectangular, square, triangular, and etc.) The flange 124 includes a back face 126, adapted to abut against the piece of telecommunications equipment when the housing 102 is inserted within the opening defined by the telecommunications equipment, and a front face 138, parallel to face 126. The flange 124, preferably, has a cross-dimension (e.g., diameter) less than 0.5 inches. More preferably, the flange 124 has a cross-dimension (e.g., diameter) less than 0.4 inches. Most preferably the flange 124 has a cross-dimension (e.g., diameter) of about 0.3 inches. In an embodiment wherein the flange 124 has a cross-dimension of about 0.3 inches, the opening defined by the telecommunications equipment, preferably, has a cross-dimension (e.g., diameter) of about 0.25 inches. Of course, in certain embodiments, the size may vary from those specifically referenced above.

The housing 102 also includes securement structures for coupling the tracer lamp unit 100 to the piece of telecommunications equipment. In FIGS. 4-11, the securement structure is illustrated as a plurality of shear ribs 128 adjacent the flange

124. The plurality of ribs 128 are tapered so as to define an outer dimension 139 that increases in size in a direction extending from the second end 116 to the first end 118. The shear ribs 128 are sized accordingly to provide a press-in fit to the piece of telecommunications equipment. The shear ribs 128 represent one example of many types of mounting structures that may be used for press fitting the housing 102 into an opening defined by the telecommunications equipment. Other structures such as bumps, tabs, ramps, ratchet teeth, shoulders, and etc. can be used to press-fit the housing 102 to the piece of telecommunications equipment.

As used herein, the term press-in fit refers to any type of secure fit that can be generated by linearly inserting or pressing the housing 102 into a corresponding receptacle. Therefore, as used herein, the term press-fit or press-in fit includes snap-fit, friction fit, interference fit, taper-fit and etc.

The housing also includes a main body portion 130 extending from the plurality of shear ribs 128 to the second end 116. The main body portion 130 generally is adapted to provide structural support for components for establishing an electrical connection to a lighting arrangement 104. In the embodiment of FIGS. 4-11, the main body portion 130 has a rounded cross section, but may have a cross-section of any shape (e.g., rectangular, square, triangular, and etc.). The main body portion 130 of the housing 102, preferably, has a cross-dimension (e.g., diameter) less than 0.4 inches. More preferably, the main body portion 130 of the housing 102 has a cross-dimension (e.g., diameter) less than 0.3 inches. Most preferably, the main body portion 130 of the housing 102 has a cross-dimension (e.g., diameter) of about 0.24 inches. In an embodiment wherein the main body portion 130 of the housing 102 has a cross-dimension of about 0.24 inches, the opening defined by the telecommunications equipment, preferably, has a cross-dimension (e.g., diameter) of about 0.25 inches to enable the housing to be slidably inserted into the opening defined by the telecommunications opening. Of course, in certain embodiments, the size may vary from those specifically referenced above.

The main body portion 130 of the housing 102 includes certain structures having complementary shape to springs 111 to hold the springs 111 in a stable position relative to the housing 102. For example, the main body portion 130 of the housing 102 also includes, adjacent the second end 116, flex portions 133 defining the notches 129 shaped to receive the mounting/stabilization portions 113 of the springs 111. The notches 129 are generally U-shaped notches adapted to complement the shape of the springs 111 and slidably receive the mounting portions 113 of the springs 111. The flex portions 133 firmly hold the mounting portions 113 of the springs 111 with a press-in fit when the mounting portions 113 are inserted into the notches 129.

The flex portions 133 of the main-body portion 130 of the housing are adapted to flex radially outwardly when the mounting portions 113 of the springs 111 are slidably inserted into the notches 129 of the housing 102. If a snap-fit locking arrangement is used, as mentioned above, the mounting portions 113 of the springs 111 may include ramps or other structures such as bumps, tabs, ratchet teeth, shoulders, and etc., and the notches 129 may include snap-fit slots defined by the flex portions 133 adapted to receive ramps of the mounting portions 113 of the springs 111.

As depicted the mounting portions 113 of the springs 111 are slidably inserted into the notches 129 from the right side 117 of the housing 102. However, in other embodiments, openings for the notches 129 can be located on the left side 119 of the housing. Yet, in other embodiments, the notches 129 can be configured such that springs 111 are inserted into the notches from both sides of the housing, one spring being inserted from the right side 117, one spring being inserted from the left side 119.

Once the springs 111 are inserted into the notches 129 of the housing 102, the tail portions 112 extend axially outwardly from the second end 116. In one embodiment, the tail portions 112 are shaped to remain within the outer perimeter of the cross-section of the main body portion 130 such that no part of the springs 111 project outwardly radially beyond the curved boundary defined by the outer surface 122 of the housing at the main body portion 130. The contact portions 114 of the springs 111 are located inside the opening 127 of the main body portion 130 of the housing 102 when the mounting portions 113 of the springs 111 are inserted into the notches 129, ready to engage the leads 110. The main body portion 130 defines flat shoulders 148 located on the sides of the opening 127. The tabs 149 of the contact portions 114 of the springs 111 rest on these flat shoulders 148 to prevent the contact portions 114 from touching each other when the lighting arrangement is not inserted into the housing 102.

Figure 4:
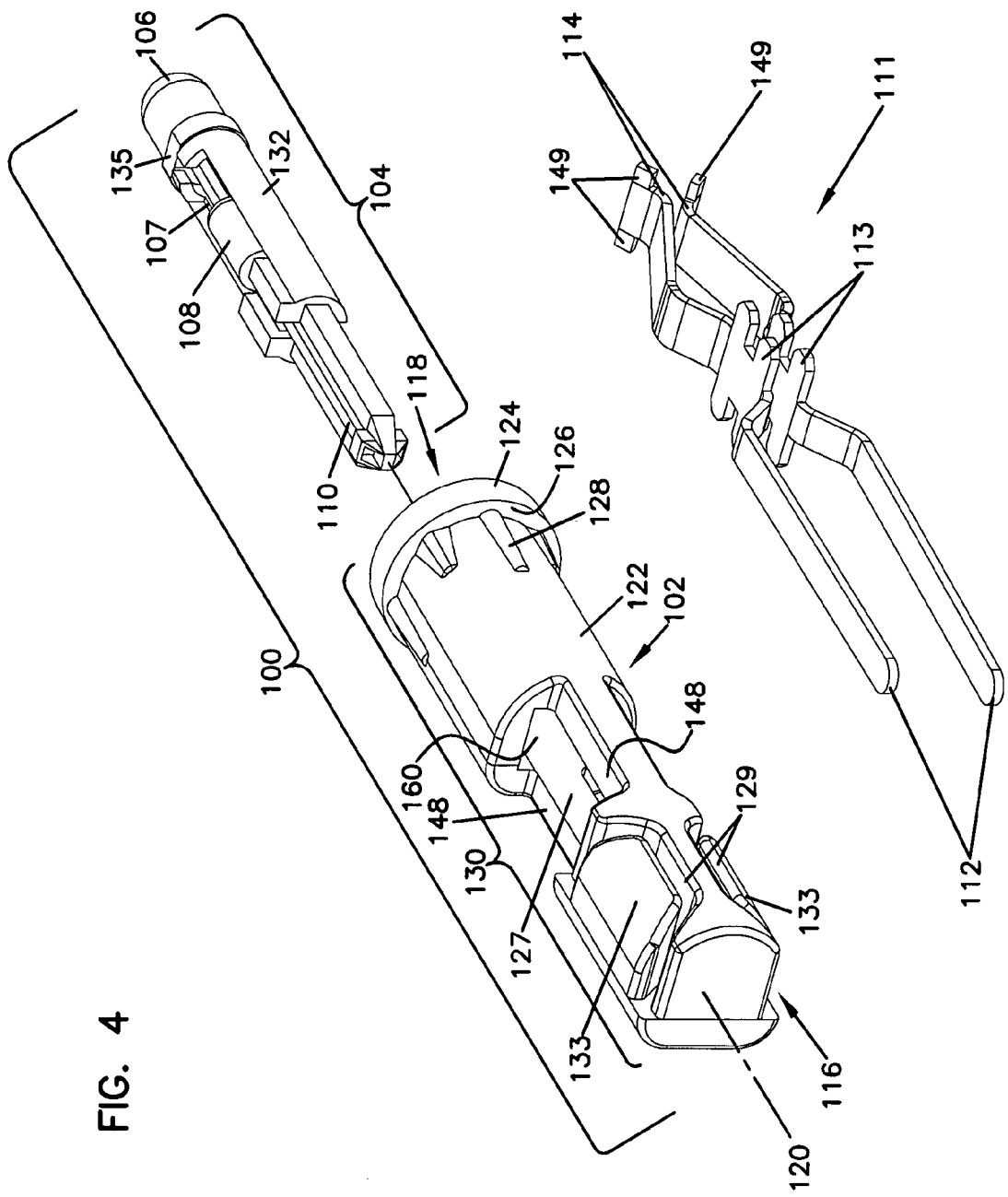
FIG. 4 shows an embodiment of the tracer lamp unit depicted in FIG. 3 in a disassembled configuration and in isolation from the cross-connect panel.
Figure 4A:
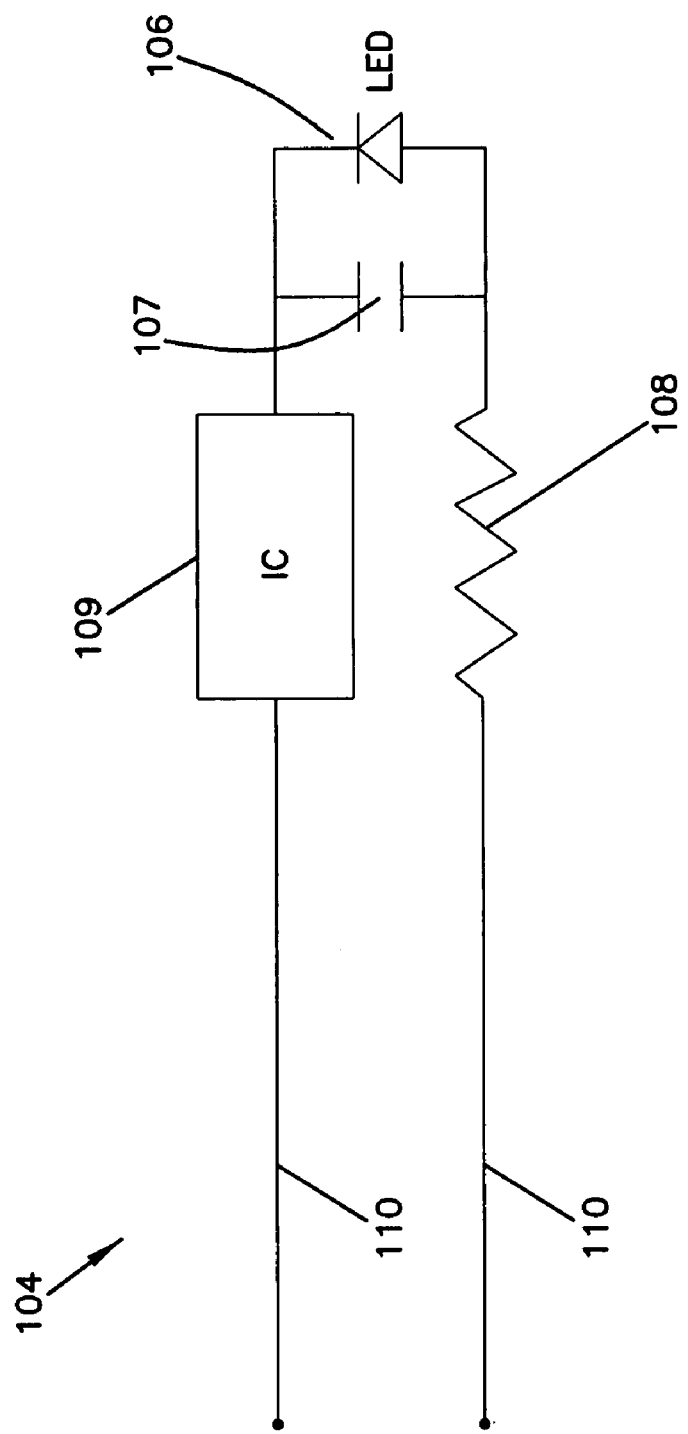
FIG. 4A shows a schematic view of a lighting arrangement of the type used with the tracer lamp unit of FIG. 4.
Figure 5:
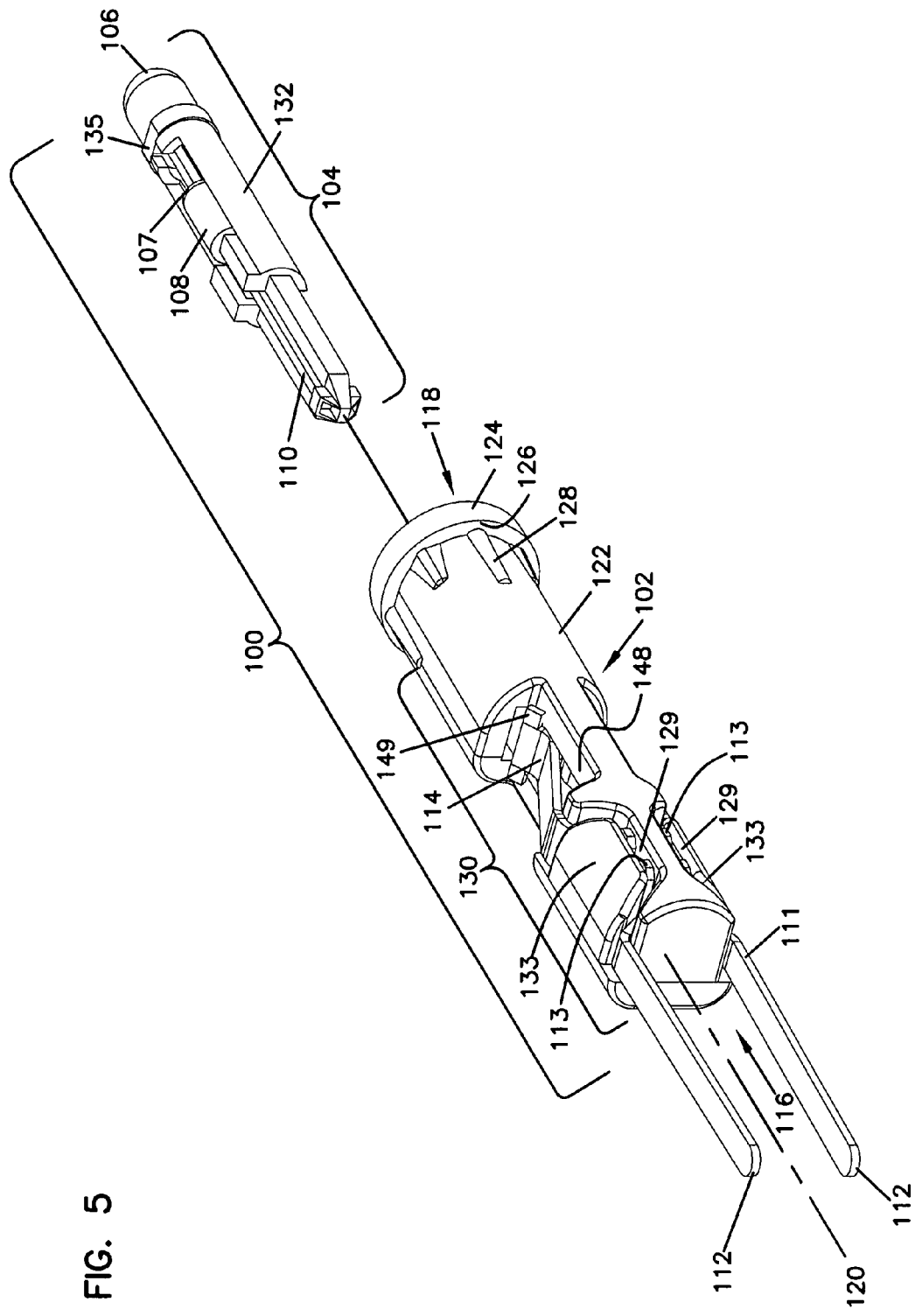
FIG. 5 shows the embodiment of the tracer lamp unit of FIG. 4 with only the LED flashing module removed from the housing.
Figure 6:
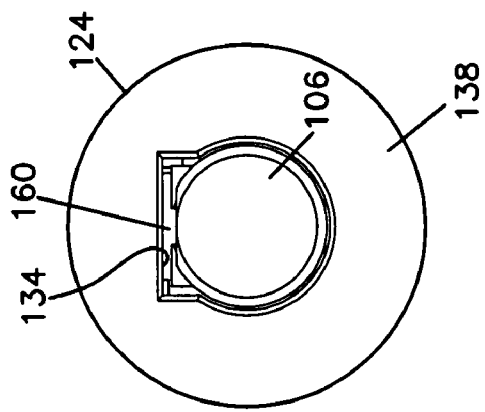
FIG. 6 shows a front-end view of the embodiment of the tracer lamp unit of FIGS. 4 and 5 in an assembled configuration.
Figure 7:
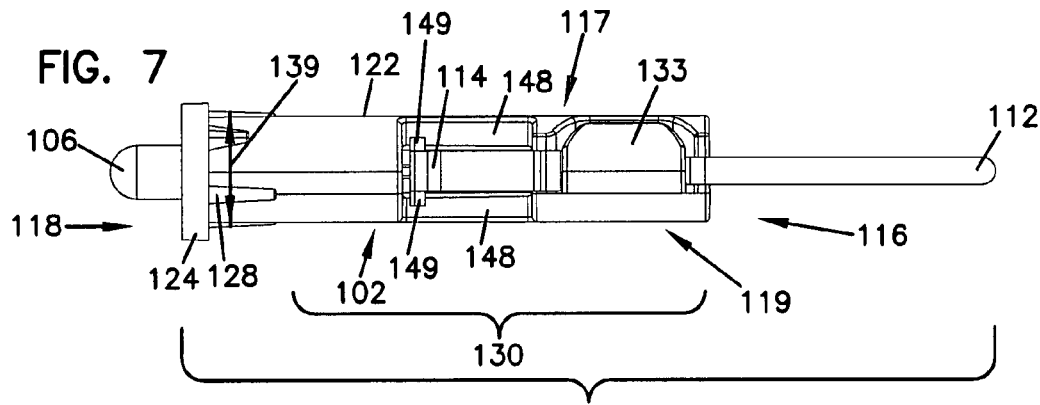
FIG. 7 shows a top view of the embodiment of the tracer lamp unit of FIGS. 4-6 in an assembled configuration.
Figure 8:
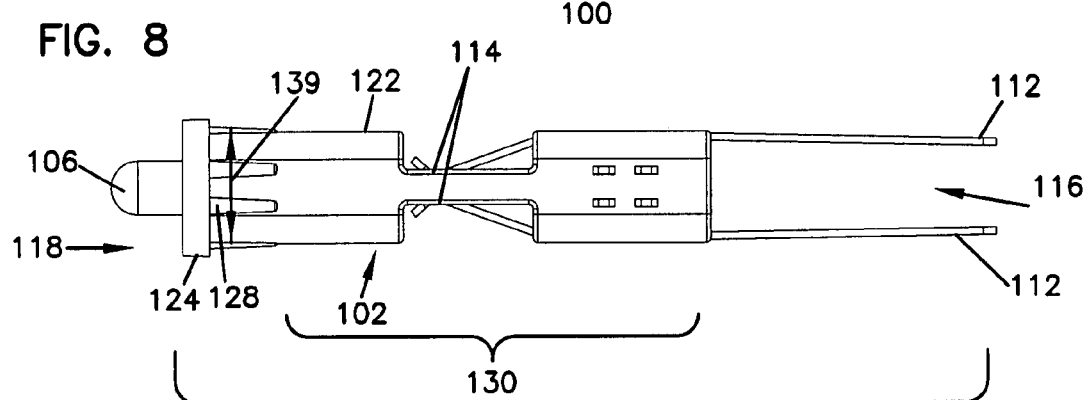
FIG. 8 shows a left side view of the embodiment of the tracer lamp unit of FIGS. 4-7 in an assembled configuration.
Figure 9:
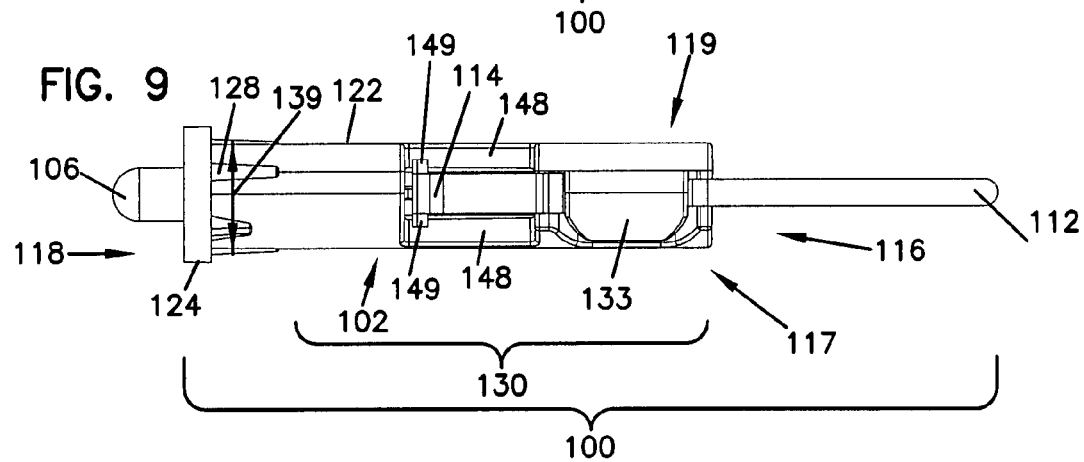
FIG. 9 shows a bottom view of the embodiment of the tracer lamp unit of FIGS. 4-8 in an assembled configuration.

Referring to FIGS. 4 and 5, in one embodiment, the lighting arrangement 104 may be part of a single module 132 removable from the housing 102. In such an embodiment, the housing 102 is adapted to slidably receive, provide structural support for, and be separable from the lighting module 132. The lighting module 132 is inserted into a single port 160, the opening for which, is defined by the front face 138 of the housing (as shown in FIG. 6) to establish an electrical connection between the flashing control circuitry and the tail portions 112 of the springs 111. The lighting module 132 is held within the port 160 of the housing 102 due to a press-fit created between the contact portions 114 of the springs 111 and the leads 110 of the lighting arrangement 104, as shown in FIG. 10A. When the module 132 is removed from the housing 102, the flashing control circuitry electrically and mechanically disconnected from the tail portions 112, and in turn, from the entire cross-connect system.

In the embodiment of the housing 102 wherein the lighting arrangement 104 is part of a single module 132 removable from the housing 102, the housing may include an orientation feature 134 defined by the front face 138 to correctly orient the lighting module 132 before inserting it into the housing to ensure that a proper electrical connection has been established between the flashing control circuitry and the tail portions 112 of the tracer lamp unit 100. As shown in FIG. 6, the orientation feature 134 includes a flat provided at one side of the otherwise round port 160. In such an embodiment, the lighting module 132 is shaped to complement the orientation feature 134 to provide for correct positioning of the module during insertion into the tracer lamp unit housing 102. For example, the module 132 can have a complementary flat 135.

B. Mounting Method

Referring to FIG. 3, the tracer lamp unit housing 102 is sized and shaped to be mounted in a D-shaped opening 200 defined at the front face of the panel 60. The tracer lamp unit housing 102 is mounted in the opening 200 by inserting the second end 116 of the tracer lamp unit housing 102 rearwardly through the opening 200. As the tracer lamp unit housing 102 is slid through the opening 200, the shear ribs 128 make contact and start to press-against the surrounding edge 210 of the opening defined by the front face of the panel 60 until a press-fit connection with the panel 60 is established. The shear ribs 128 are configured to securely retain the housing 102 within the opening 200.

Figure 11:
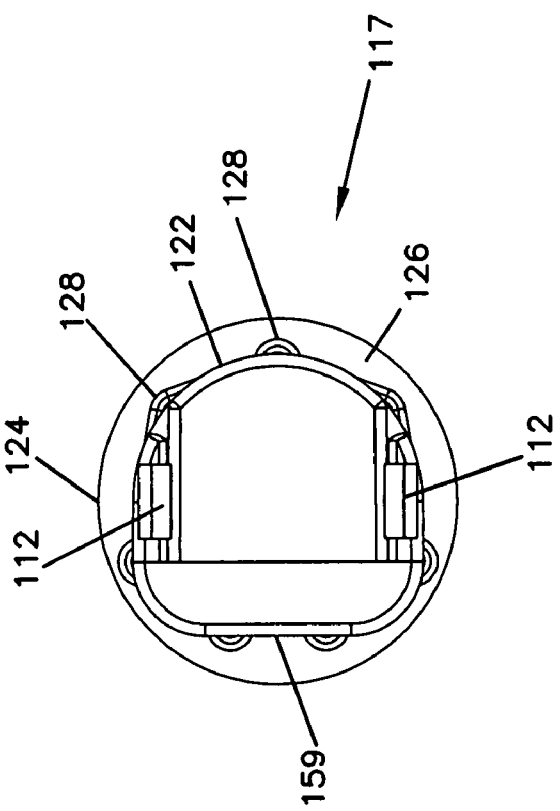
FIG. 11 shows a back-end view of the embodiment of the tracer lamp unit of FIGS. 4-10 in an assembled configuration.

The opening 200 defined by the telecommunications equipment may include an orientation feature 220, illustrated as a flat positioned within an otherwise round hole, to correctly orient the tracer lamp unit housing 102 before inserting it into the telecommunications equipment. The housing 102 is shaped to complement the orientation feature 220 to provide for correct positioning of the housing 102 during insertion into the panel 60. For example, as shown at FIG. 11, the main body 130 of the housing includes a flat 159 that complements the flat 220 of the hole 200.

Once coupled, the face 126 of the flange 124 abuts against the panel 60 and ensures proper depth of insertion of the tracer lamp unit housing 102 into the panel 60.

To remove the tracer lamp unit housing 102 from the telecommunications equipment, the housing 102 can simply be slid out of the opening 200 defined by the front face of the panel 60 using enough force to overcome the opposing frictional force provided by the interference fit between the shear ribs 128 and the edge 210 surrounding the opening 200. If other types of structures such as bumps, tabs, ramps, ratchet teeth, shoulders, or etc. are used to press-fit the housing 102 to a piece of telecommunications equipment, the housing 102 can be uncoupled in various ways depending on the press-fit configuration used.

If an embodiment of the tracer lamp unit 100 is used wherein the lighting arrangement 104 is housed in a module 132 which is removable from the housing 102, the lighting module 132 can simply be removed from the housing 102 for replacement purposes without dislodging the housing 102 from the panel 60.

It will be appreciated that many embodiments of the invention can be made without departing from the spirit and scope of the invention, and that the broad scopes of the inventions are not intended to be limited by the specific embodiments depicted and described herein.

What is claimed is:

1. A tracer lamp unit for insertion into an opening of a piece of telecommunications equipment, the tracer lamp comprising:
    an elongate housing having a front end positioned opposite from a rear end, the housing having a generally rounded cross-section, the front end defining a port;
    spring members mounted to the housing, the spring members including electrical contact portions; and
    a lighting arrangement mounted within the port of the housing, the lighting arrangement including a lighting element and leads, the leads contacting the electrical contact portions of the spring members when the lighting arrangement is mounted within the port, wherein the housing includes a flange at the front end including a face adapted to abut against the telecommunications equipment when inserted within the opening defined by the telecommunications equipment, the housing also including a plurality of shear ribs adjacent the flange, the plurality of ribs defining an outer dimension that increases in size in a direction extending from the rear end to the front end, the shear ribs adapted to provide the press-in fit to the opening of the telecommunications equipment.

2. A tracer lamp unit according to claim 1, wherein the lighting arrangement includes an LED flashing arrangement.

3. A tracer lamp unit according to claim 1, wherein the flange includes a diameter less than 0.5 inches.

4. A tracer lamp unit according to claim 1, wherein the flange includes a diameter less than 0.4 inches.

5. A tracer lamp unit according to claim 1, wherein the lighting arrangement includes a module carrying the lighting element and the leads, the module also carrying a capacitor, a resistor, and circuitry for controlling flashing, wherein the lighting element, the leads, the capacitor, the resistor, and the circuitry for controlling flashing are electrically connected, the module being removable from the housing.

6. A tracer lamp unit according to claim 1, wherein the housing includes means for providing a press-in place connection with the piece of telecommunications equipment.

7. A tracer lamp unit according to claim 1, wherein the springs include tails that project rearwardly from the rear end of the housing.

8. A tracer lamp unit comprising:
    an LED flashing module including a lighting element, a capacitor, a resistor, leads, and a
    circuitry for controlling flashing, wherein the lighting element, the leads, the capacitor,
    the resistor, and the circuitry for controlling flashing are electrically connected;
    spring members including tail portions and electrical contact portions, wherein the electrical contact portions engage the leads to provide an electrical connection therebetween; and
    a housing having a front face defining a single port, the housing adapted to slidably receive, provide structural support for, and be separable from the LED flashing module, the housing providing structural support for the tail portions and the electrical contact portions of the spring members,
    wherein the housing is configured to be secured within an opening defined by a piece of telecommunications equipment, wherein, once secured, the housing is held within the telecommunications equipment with a press-in fit, and wherein the LED flashing module fits within the single port of the housing.

9. A tracer lamp unit for insertion into an opening of a piece of telecommunications equipment, the tracer lamp comprising:
    an elongate housing having a front end positioned opposite from a rear end, the housing having a maximum transverse cross-sectional dimension less than 0.3 inches, the front end defining a port;
    spring members mounted to the housing, the spring members including electrical contact portions; and
    a lighting arrangement mounted within the port of the housing, the lighting arrangement including a lighting element and leads, the leads contacting the electrical contact portions of the spring members when the lighting arrangement is mounted within the port, wherein the lighting arrangement includes a module carrying the lighting element and the leads, the module also carrying a capacitor, a resistor, and circuitry for controlling flashing, wherein the lighting element, the leads, the capacitor, the resistor, and the circuitry for controlling flashing are electrically connected, the module being removable from the housing.

10. A tracer lamp unit according to claim 9, wherein the housing includes a flange adjacent the front end.

11. A tracer lamp unit according to claim 9, wherein the housing includes means for providing a press-in place connection with the piece of telecommunications equipment.

12. A tracer lamp unit according to claim 10, wherein the flange includes a diameter less than 0.5 inches.

13. A tracer lamp unit according to claim 12, wherein the flange includes a diameter less than 0.4 inches.

14. A tracer lamp unit according to claim 13, wherein the flange includes a diameter of about 0.3 inches.

15. A tracer lamp unit according to claim 9, wherein the housing defines an orientation feature for aligning the housing within the opening of the piece of telecommunications equipment.

16. A tracer lamp unit according to claim 8, wherein the LED flashing module includes an exterior surface defining a first flat, wherein the housing includes an interior surface defining a second flat, the second flat defined as an orientation feature adjacent the single port for intermating with the first flat of the LED flashing module, the housing also including a generally round exterior surface defining a third flat as an orientation feature for intermating with the opening defined by the piece of telecommunications equipment.

17. A tracer lamp unit for insertion into an opening of a piece of telecommunications equipment, the tracer lamp comprising:

an elongate housing having a front end positioned opposite from a rear end, the housing having a generally rounded cross-section, the front end defining a port;

spring members mounted to the housing, the spring members including electrical contact portions; and a lighting arrangement mounted within the port of the housing, the lighting arrangement including a lighting element and leads, the leads contacting the electrical contact portions of the spring members when the lighting arrangement is mounted within the port, wherein the lighting arrangement includes a module carrying the lighting element and the leads, the module also carrying a capacitor, a resistor, and circuitry for controlling flashing, wherein the lighting element, the leads, the capacitor, the resistor, and the circuitry for controlling flashing are electrically connected, the module being removable from the housing.

18. A tracer lamp unit for insertion into an opening of a piece of telecommunications equipment, the tracer lamp comprising:

an elongate housing having a front end positioned opposite from a rear end, the housing having a generally rounded cross-section, the front end defining a port;

spring members mounted to the housing, the spring members including electrical contact portions, wherein the spring members include tails that project rearwardly from the rear end of the housing; and a lighting arrangement mounted within the port of the housing, the lighting arrangement including a lighting element and leads, the leads contacting the electrical contact portions of the spring members when the lighting arrangement is mounted within the port.

19. A tracer lamp unit for insertion into an opening of a piece of telecommunications equipment, the tracer lamp comprising:

an elongate housing having a front end positioned opposite from a rear end, the housing having a maximum transverse cross-sectional dimension less than 0.3 inches, the front end defining a port, wherein the housing includes a flange adjacent the front end;

spring members mounted to the housing, the spring members including electrical contact portions; and a lighting arrangement mounted within the port of the housing, the lighting arrangement including a lighting element and leads, the leads contacting the electrical contact portions of the spring members when the lighting arrangement is mounted within the port.

20. A tracer lamp unit for insertion into an opening of a piece of telecommunications equipment, the tracer lamp comprising:

an elongate housing having a front end positioned opposite from a rear end, the housing having a maximum transverse cross-sectional dimension less than 0.3 inches, the front end defining a port, wherein the housing includes means for providing a press-in place connection with the piece of telecommunications equipment;

spring members mounted to the housing, the spring members including electrical contact portions; and a lighting arrangement mounted within the port of the housing, the lighting arrangement including a lighting element and leads, the leads contacting the electrical contact portions of the spring members when the lighting arrangement is mounted within the port.

21. A tracer lamp unit for insertion into an opening of a piece of telecommunications equipment, the tracer lamp comprising:

an elongate housing having a front end positioned opposite from a rear end, the housing having a maximum transverse cross-sectional dimension less than 0.3 inches, the front end defining a port, wherein the housing defines an orientation feature for aligning the housing within the opening of the piece of telecommunications equipment;

spring members mounted to the housing, the spring members including electrical contact portions; and a lighting arrangement mounted within the port of the housing, the lighting arrangement including a lighting element and leads, the leads contacting the electrical contact portions of the spring members when the lighting arrangement is mounted within the port.

\* \* \* \* \*